(12) United States Patent
Stamm et al.

(10) Patent No.: US 6,705,523 B1
(45) Date of Patent: Mar. 16, 2004

(54) SYSTEM AND METHOD FOR DELIVERING SUPPLIES TO A PRODUCTION LINE

(75) Inventors: Erick F. Stamm, Dublin, OH (US); Michael Endsley, Marysville, OH (US)

(73) Assignee: Honda of America Mfg. Inc., Maryshire, OH (US)

( * ) Notice: Subject to any disclaimer, the term of this patent is extended or adjusted under 35 U.S.C. 154(b) by 0 days.

(21) Appl. No.: 10/256,992

(22) Filed: Sep. 27, 2002

(51) Int. Cl.$^7$ .............................................. G06F 17/60
(52) U.S. Cl. ...................................... 235/385; 235/383
(58) Field of Search ................................. 235/383, 385

(56) References Cited

U.S. PATENT DOCUMENTS

| | | | |
|---|---|---|---|
| 4,737,068 A | 4/1988 | Mochizuki | 414/745 |
| 4,773,523 A | 9/1988 | Hansen, Jr. et al. | 198/420 |
| 4,950,118 A | 8/1990 | Mueller et al. | 414/274 |
| 5,214,588 A | 5/1993 | Kaneko et al. | 364/468 |
| 5,687,851 A | 11/1997 | Schonenberger | 209/44.1 |
| 5,896,297 A | 4/1999 | Valerino, Sr. | 364/478.01 |
| 6,079,570 A | 6/2000 | Oppliger et al. | 209/630 |
| 6,559,760 B2 * | 5/2003 | Samjima et al. | 235/385 |

* cited by examiner

Primary Examiner—Harold I. Pitts
(74) Attorney, Agent, or Firm—Standley & Gilcrest LLP (57) ABSTRACT

A system and method is disclosed for delivering supplies from a loading dock to a production line using a supply delivery computer system that interfaces with a conveyor computer system to control transportation of supplies from a conveyor system to pickup stations and a vehicle facility manager computer system to control automated guided vehicles that transport supplies from pickup stations on the conveyor system to delivery stations on a production line. Supplies are labeled with barcodes indicating production line delivery location (i.e., an identifier for a delivery station), load sequence number, load quantity, and lot number to facilitate tracking and routing from the time they are unloaded at the manufacturing plant loading dock on to the conveyor system until they delivered to delivery stations on the production line.

34 Claims, 9 Drawing Sheets

| Dely Loc | Total | Loaded | Del'ved | Needed | Complete T stp |
|---|---|---|---|---|---|
| CA05 | 4 | 4 | 2 | Y | |
| CA10 | 4 | 4 | 2 | Y | |
| CA18 | 2 | 2 | 2 | Y | |
| CA24 | 10 | 18 | 2 | Y | |
| CA34 | 6 | 6 | 0 | Y | |
| CA40 | 8 | 6 | 0 | Y | |
| CA61 | 2 | 2 | 1 | Y | |
| CB08 | 1 | 1 | 0 | Y | |
| CB12 | 0 | 0 | 0 | N | |
| CB14 | 0 | 0 | 0 | N | |

PLANT T
LINE 3
ZONE C
DEL LOC

LOT NO 0202066

☐ LOADING COMPLETED
☐ DELIVERY COMPLETED

EXIT

LOAD TOTAL
TOTAL LOADED
TOTAL DELIVERED
DELIVERY NEEDED

UPDATE

DELIVERY LOCATION PROGRESS MAINTENANCE

AS C ZONE-DEL LOC PROGRESS | 2/7/02 | 10:40AM | MM00924 | SELECT LOT NO

Fig. 8

LOAD DATA MAINTENANCE — 800

802
- LOT NO: 0203025
- LOAD ID: CAI8010202030025
- ADD NEW

804
- DEL LOC: CAI8
- LOT NO: 0203025
- LOAD NO: 1
- LOAD TOTAL: 2
- LOAD ID PLC: ICAI8010202030251
- STATUS CODE: 10
- CONVEYOR ID: CLA
- CONVEYOR LANE: 1
- CONV LOAD POINT
- ○ SHORT SCAN  ● FULL SCAN
- DELETE
- UPDATE

806
- ☐ CREATE TSTP  3/5/02 10:27:41AM
- ☐ RECV TSTP
- ☐ AGV QUEUE TSTP
- ☐ LOAD TSTP
- ☐ AGV TSTP
- CHECK ANY BOX THAT THE TIMESTOP NEEDS TO BE UPDATED
- EXIT

Status bar: AS C ZONE-LOAD DATA MAINT | 3/5/02 | 1:55 PM | MM0924 | SELECT LOAD ID

Fig. 9

SYSTEM AND METHOD FOR DELIVERING SUPPLIES TO A PRODUCTION LINE

FIELD OF THE INVENTION

The present invention relates to systems and methods for delivering supplies to a production line in a manufacturing environment. In particular, the present invention relates to an automated system and method for delivering supplies to a production line in which supplies are transported from a loading dock to a location on a production line using a supply delivery computer that manages the transportation of supplies using conveyor systems and automated guided vehicles.

BACKGROUND OF THE INVENTION

Current methods of delivering supplies to production or assembly lines in manufacturing or assembly plants are often labor-intensive processes that typically require the manufacturing company to maintain within the plant an inventory of supplies to meet production requirements. First, supplies are unloaded from a trailer at a loading dock to a first area on the manufacturing plant floor that is located close to the loading dock. Next, they are moved to another area of the manufacturing plant floor where they are organized for delivery to the production lines. Associates who are responsible for managing the supplies use paper lists and check sheets to verify manually that the needed supplies have been received from the supplier and have been delivered line side for use in the production line. The associates also rely on sequence lists and check sheets to organize the supplies and indicate where they should be located before they are transported to a production line. Small parts which are transported in bins on a pallet are often stored temporarily in the same area on the manufacturing floor and then manually handled during the process of preparing them for delivery to production lines. Next, depending on the level of automation in the plant, supplies are transported from the manufacturing plant floor to production lines using forklifts or automated guided vehicles.

With current methods, the supplies are often handled by many associates. Delays in delivering supplies to the production line often result due to the number of times the supplies are handled by different associates and the time-consuming process of manually reviewing and updating the sequence lists and check sheets as supplies are delivered line side. Although attempts are made to organize supplies on the manufacturing plant floor based on the order in which they are likely to be used (as may be indicated in a production schedule), the actual order for the production line seldom matches the order indicated in the production schedule. Some supplies may be needed on the production line more quickly than anticipated. Slight variations in the way different sections of the production line run often require significant manual labor to locate a needed part and rearrange the supplies on the manufacturing plant floor to obtain and transport the parts to the production line. Some changes in the production schedule may require several associates to respond and determine what supplies are needed line side and how they can be located and delivered. Misdeliveries may occur when the wrong supplies are delivered line side or if the supplies are sent to the wrong location on the production line. If the associates cannot respond quickly or misdeliveries occur, delays in production may result and cause significant increases in production costs.

Attempts to automate certain steps within the supply delivery process have been made, but none fully automate the process nor do they result in significant reductions in the amount of labor required to deliver supplies line side or in the level of inventory maintained at the manufacturing plant. U.S. Pat. No. 5,214,588 to Kaneko discloses a control apparatus for a flexible manufacturing system (FMS) line in which a production instruction device determines a schedule for supplying jigs on the basis of a work supply order schedule. An automated guided vehicle (AGV) skips unavailable stations and moves to an available station based on the presence or absence of a workpiece and/or a jig. U.S. Pat. No. 5,687,851 to Schonenberger discloses a method of sorting individually conveyed articles into groups in at least one sorting step in a suspension type conveyor. The articles are introduced unsorted into a first conveyor circle and are delivered sorted from the first conveyor circle to a second conveyor circle. U.S. Pat. No. 4,950,118 to Mueller discloses a system for loading and unloading trailers using automatic guided vehicles. Free-ranging automatic guided vehicles that employ sensors for monitoring pedestrian, operator driven vehicles, and other AGV traffic also ensure that trailers are parked in position for loading and unloading. Signals for controlling traffic and trailer-mounted targets for AGV navigation are also used.

The disclosed systems support only a few steps in the supply delivery process, and they do not support automated delivery of supplies from a loading dock to a production line. Therefore, there is a need for a supply delivery system and method that reduces manual handling of supplies and that reduces the need for maintaining an inventory of supplies at a production facility.

SUMMARY OF THE INVENTION

The present invention is a system and method for delivering supplies from a loading dock to a production line using a supply delivery computer system-Autosend-that interfaces with a conveyor computer system that controls transportation of supplies from a conveyor system to pickup stations and a vehicle facility manager computer system that controls automated guided vehicles to transport supplies from pickup stations on the conveyor system to delivery stations on the production line. Using the present invention, no manual handling of supplies is required from the time supplies are unloaded at the manufacturing plant loading dock until they are delivered to the production line. A plurality of delivery stations along the production line are adapted to receive supplies from automated guided vehicles. The supply delivery computer system interfaces with the conveyor computer system and the vehicle facility manager computer system to track the location of supplies and to ensure that the appropriate supplies are delivered to the production line delivery stations. Supplies are labeled with barcodes indicating production line delivery location (i.e., an identifier for a delivery station), load sequence number, load quantity, and lot number to facilitate tracking and routing in accordance with the present invention from the time they are unloaded at the manufacturing plant loading dock until they are delivered to the production line.

Supplies received from various suppliers at a loading dock are first transported from a trailer to loading positions on a random access conveyor system. As supplies are loaded onto the conveyor system loading stations, the conveyor computer system scans the supply barcodes and verifies that they match the supplies that are expected according to a production schedule check list. Supplies accumulate on the conveyor system and are routed to automated guided vehicle pickup stations for delivery to delivery stations on the production line. Because the conveyor system is random access, supplies may be loaded on conveyor lanes in any order and located when needed. When supplies are requested, they are located based on conveyor position within the conveyor system, transported to pickup stations on the conveyor system, and transported by automated guided vehicles from pickup stations to production line delivery stations. Supplies are loaded on the conveyor system based on a production line schedule while current production line requirements determine which supplies are removed from the conveyor system and are delivered to the production line. The supply delivery computer system operates in conjunction with the conveyor computer system and vehicle facility manager computer system to track and report on levels of supply inventory on the conveyor system as well as supplies that are in route to a production line delivery station and supplies that have been delivered to a production line delivery station.

The supply delivery computer system receives requests for deliveries of supplies from delivery stations on the production line. Each delivery station on the production line is equipped with sensors to detect the presence of supplies at the station. Each delivery station may have one or more load positions for accommodating supplies that are delivered by the automated guided vehicles to the delivery stations. When a delivery station determines that a load position is empty, a request for delivery of supplies is initiated. As requests for deliveries of supplies are initiated and processed by the supply delivery computer system in conjunction with the vehicle facility manager computer, automated guided vehicles are dispatched by the vehicle facility manager to the pickup stations at the conveyor system to receive loads of supplies and deliver them to the delivery station locations on the production line where the requests were initiated. The supply barcodes are used to track the dispatching, routing, and delivery of supplies from the pickup stations at the conveyor system to the delivery stations on the production line.

The supply delivery computer system comprises a request manager and related screens for monitoring requests for supplies that are initiated at the production line delivery locations and that are fulfilled by the conveyor system computer and vehicle facility manager computer. The request manager screens provide status information regarding all production line requests. The supply delivery computer system also comprises functions for initializing delivery station locations on the production line, inventory recovery, current lot maintenance, delivery progress maintenance, load data maintenance, and stop indicators.

DESCRIPTION OF EXAMPLE EMBODIMENTS

Figure 1:
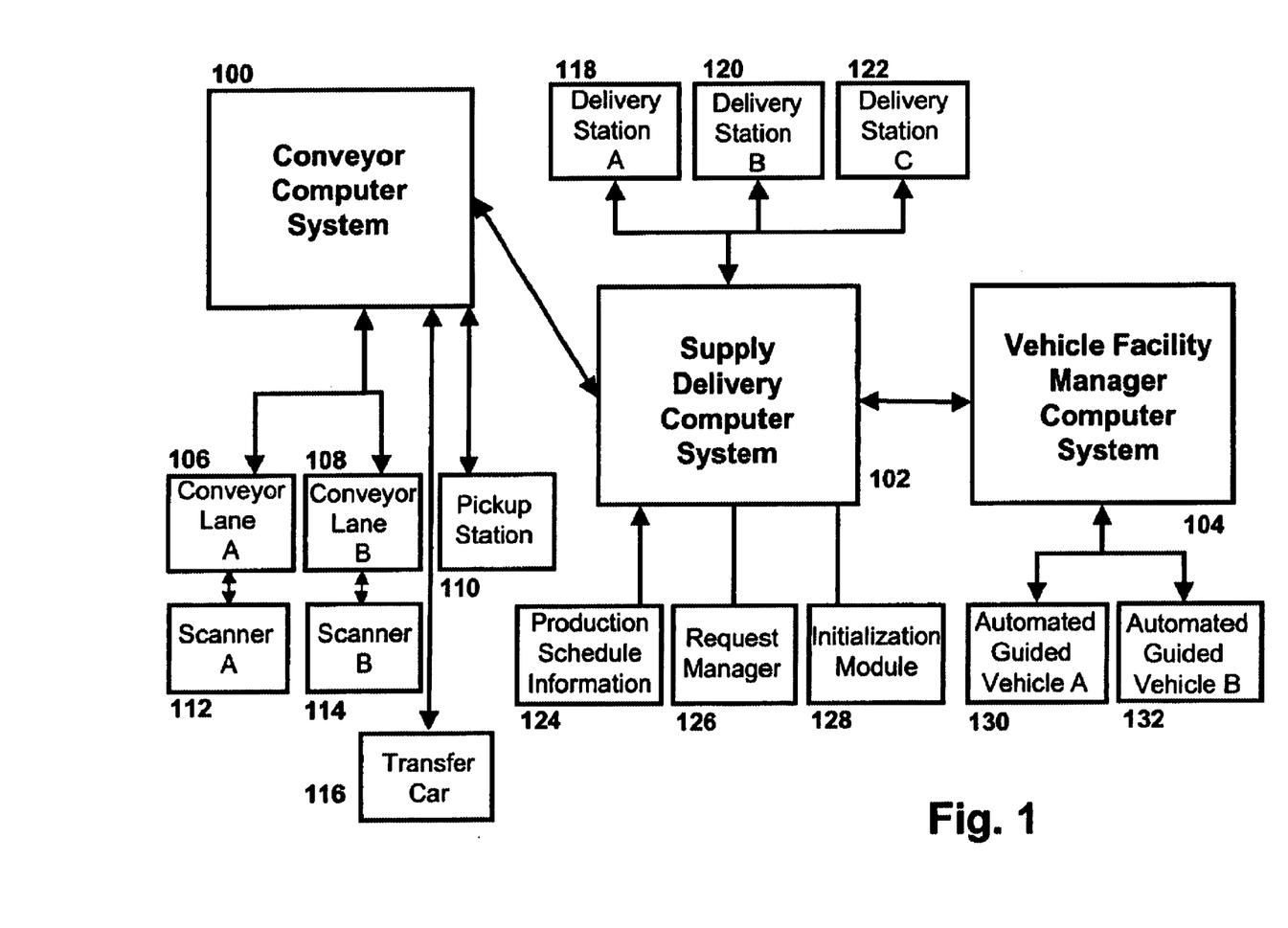
FIG. 1 is a block diagram of the primary components for an example embodiment of the present invention.

Referring to FIG. 1, a block diagram of the primary components for an example embodiment of the present invention is shown. A supply delivery computer system 102 interfaces to a conveyor computer system 100 and a vehicle facility manager computer system 104 to provide the features and functionality of the present invention. In an example embodiment of the present invention, Ethernet communications may be used to transmit data and information between the supply delivery computer system 102, a conveyor computer system 100, and a vehicle facility manager computer system 104. Device-level networks (such as ODVA's DeviceNet) and radio-frequency communications may be used to control the conveyor system and AGVs. The supply delivery computer system 102 manages requests for supplies that are initiated by a plurality of delivery stations 118, 120, 122 located on the production line by communicating with the conveyor computer system 100 which controls the operation of a plurality of conveyor lanes 106, 108 and the vehicle facility manager computer system 104 which controls a plurality of automated guided vehicles (AGVs) 130, 132.

The conveyor computer system 100 comprises features and functionality related to control and operation of the conveyor system for receiving incoming supplies and transporting them for delivery to the production line. The conveyor system may comprise a plurality of conveyor lanes 106, 108 for holding incoming supplies. Supplies may arrive at the production facility in a variety of different types of containers that are placed on pallets (or racks or any other type of platform, base, or device adapted to hold supplies or supply containers) to facilitate transfer of supplies or supply containers from one place to another (supply load). Each conveyor lane 106, 108 may comprise a plurality of conveyor lane positions (i.e., random access locations) in which supply loads (e.g., supply container and pallet, supply container, etc.) may be held until needed on the production line. A first or front conveyor lane position on each conveyor lane may be reserved for supply loads that are waiting to be transferred to an AGV pickup station for transfer to the production line by an AGV.

In an example embodiment of the present invention, the conveyor computer system 100 supports random access so that supplies may be loaded in any order on to outbound lanes of the conveyor lanes 106, 108 of the conveyor system. Supplies are loaded on the outbound conveyor lanes 106, 108 according to a production schedule check list so that the supplies that are expected on the production line are available on the conveyor system when requested and may be transported and delivered by the AGVs 130, 132 to delivery stations 118, 120, 122 on the production line. Scanners 112, 114 on the conveyor lanes 106, 108 of the conveyor system read barcode labels on the incoming supplies. As incoming supplies are received and scanned at the outbound conveyor lanes 106, 108, the supply delivery computer system 102 verifies that they match the supplies that are expected according to the production schedule. In an example embodiment of the present invention, supplies are loaded into the last position (or back position) on a conveyor lane 106, 108 and transported to the first position (or front position) on the conveyor lane 106, 108 (by conveyor forward movement or transfer car) when requested. As supplies are removed from a conveyor lane to be transported to the production line, the remaining supply loads on the lane may be moved closer to the first position on the conveyor lane using conveyor forward movements. As supply loads are moved from the back position of the conveyor lane to the front position of the conveyor lane, the back position of the lane is opened to receive additional incoming supply loads. The conveyor computer system 100 tracks the position of each supply load as it is moved from one position to another on a conveyor lane 106, 108 so that its current position at any time may be determined.

Supply loads may be moved from any position in the conveyor lane to the first or front position of the conveyor lane using transfer cars 116. When the conveyor computer system 100—which tracks the positions of the supply loads-receives a supply request from the supply delivery computer 102, a transfer car 116 may be dispatched to the conveyor lane position where the requested supplies are located. The transfer car 116 transports the supply load from its current conveyor lane position to the front position of the conveyor. The front position may be a centering device station where the supply load is centered on a pallet for delivery to the production line. From the front position, the supply load is transferred to a pickup station 110 where the supplies are picked up by an AGV 130, 132 for delivery to a delivery station 118, 120, 122 on the production line. The supply loads that are behind the supply load removed from the conveyor lane are moved closer to the first or front position of the conveyor lane. For example, if a conveyor lane 106 has 20 supply load positions and the supplies in position 14 are requested, the transfer car 116 transports the supplies from position 14 to the first or front position of the conveyor lane and the supplies in positions 15 to 20 are moved to positions 14 to 19, respectively. Incoming supplies may then be loaded into position 20.

The conveyor computer system 100 tracks and communicates to the supply delivery computer system 102 status information to manage the delivery of supplies. For example, the conveyor computer system 100 notifies the supply delivery computer system 102 when a supply load is ready for AGV pickup at a pickup station 110 on the conveyor system. The supply delivery computer system 102 triggers the vehicle facility manager computer 104 to create an AGV delivery job for the supply load. Finally, error messages related to equipment time-out and communication problems, etc. may be sent from the conveyor computer system 100 to the supply delivery computer system 102.

In an example embodiment of the present invention, a plurality of scanners (fixed and/or handheld) are used to track supplies that have been labeled with barcodes. The barcode labels may comprise production line delivery location (i.e., an identifier for a delivery station on the production line), load sequence number, load quantity, and lot number. In an example barcode CA3509100106024, the first four characters "CA35" may indicate a delivery station location, the next four characters "0910" may indicate a sequence within lot (load sequence number), and the last seven characters "0106024" may indicate a lot number. The production schedule indicates when supplies with a particular lot and load sequence number are likely to be needed as well as where they are needed (i.e., which supplies are used at the different delivery stations on the production line). Entry scanners 112, 114 used to read barcodes of supplies as they are transported to conveyor lanes 106, 108 of the conveyor system confirm that the supplies are as expected based on the production schedule check list for the current production run. The barcode information may be passed from the conveyor computer system 100 to the supply delivery computer system 102 so that tracking of the supplies may be accomplished.

The vehicle facility manager computer system 104 provides features and functionality related to control and operation of AGVs 130, 132 on the production facility floor. When the supply delivery computer 102 receives a supply request, it communicates with the vehicle facility manager computer system 104 to dispatch an AGV to a pickup station 110 on the conveyor system. The AGV receives the supply load from the pickup station 110 and transports it to the delivery station on the production line requesting the supplies. Following delivery of the supply load, the AGV may take an empty pallet from the delivery station and return it to an AGV drop station at an inbound conveyor lane. Empty pallets are then recirculated for additional supply deliveries.

The supply delivery computer system 102 may also display the current number of open supply load requests at each production line delivery station. The vehicle facility manager computer system 104 may issue confirmations to the supply delivery control system 102 when requested jobs have been picked up and delivered by an AGV.

The supply delivery computer system 102 provides features and functionality for managing the delivery of supplies from the conveyor system to delivery stations on the production line. The supply delivery computer system 102 may comprise a request manager 126 to manage all aspects of requests for delivery of supplies. The supply delivery computer may also comprise an initialization module 128 to facilitate initialization of system components for delivery of supplies at the start of a production run. The supply delivery computer 102 automatically monitors the need for additional inventory at delivery stations 118, 120, 122 on the production line and dispatches jobs to AGVs 130, 132 through the vehicle facility manager computer 104 when a supply load is in an accessible position on the conveyor system. Production schedule information 124 is downloaded to the supply delivery computer system 102 to facilitate the management and delivery of supplies to the production line. The supply delivery computer system 102 manages supply load characteristic information including production line delivery location, sequence number within a lot, and lot number in order to service requests for supplies. The supply delivery computer system 102 keeps an ordered list (random access list) of supply loads which have been accepted into the conveyor system. Requests for supplies are received by the supply delivery computer system 102 in accordance with sensors located at delivery stations 118, 120, 122 on the production line. The delivery station sensors are adapted to detect the presence of supplies at the delivery station. If a delivery station sensor detects the presence of supplies for a specified period of time (indicating that supplies are being consumed at the location) and then detects the absence of supplies, it sends a call to the supply delivery computer 102 requesting delivery of another supply load. The supply delivery computer 102 acknowledges the request and resets the sensor for receipt of another supply load.

The supply delivery computer 102 determines which supplies are required at the delivery station and dispatches the request to the conveyor computer system 100 to retrieve the supplies. The conveyor computer system 100, using either a transfer car 116 or conveyor forward movement, moves the supplies to the AGV pickup station 110 via a centering device station. The conveyor computer system 100 informs the supply delivery computer system 102 that the supply load is at the pickup station 110. The supply delivery computer system 102 then sends a request to the vehicle facility manager computer system 104 to deliver the supply load from the pickup station 110 to a production line location. The supply delivery computer system 102 removes the supply load information from the ordered list (random access location list) and adds it to an AGV pickup list as the supply load is removed from the random access conveyor by transfer car or by conveyor forward movement (i.e., by outbound conveyor lanes in the event a transfer car is not needed to move the supply load to a pickup station). The supply load is then transferred to a pickup station 110.

The supply delivery computer system 102 issues AGV job commands to the vehicle facility manager computer 104 which references AGV pickup station and production line delivery station locations. An AGV, using the AGV pickup list, receives the supplies from a pickup station 110 and transports them to the requesting delivery station on the production line. The supply delivery computer system 102 issues status information for each production line delivery station location including the current number of open supply load requests. Status information varies depending on whether a delivery station location is not expecting any supply loads, is expecting a supply load that has not been dispatched, or is expecting a supply load that has been dispatched, but not delivered. If a delivery station has space for a supply load but does not need one according to the production schedule, the status information indicates that a delivery is not needed. The supply delivery computer 102 communications with the conveyor system computer 100 and vehicle facility manager computer 104 allow it to maintain the order and location of all supply loads needed for the production run. As a result, it provides real-time knowledge of production supply inventory from unloading at the loading dock until the supply usage point on the production line.

In an example embodiment of the present invention, the supply delivery computer 102 dispatches supply requests to the conveyor system computer 102 and vehicle facility manager computer 104 in accordance with the production schedule (lot sequence, delivery location, and load sequence). As indicated previously, the barcode labels on supplies comprise production line delivery location (i.e., an identifier for a delivery station), load sequence number, load quantity, and lot number. As supplies enter the conveyor system, the barcodes are scanned and the scanned supply information is communicated to the supply delivery computer 102. When a request for supplies is received by the supply delivery computer 102 from a delivery station, the supply delivery computer 102 determines which delivery station requested the supplies and based on the delivery station location submitting the request, determines which supplies are needed at the delivery station. Requests for supply loads that contain a smaller number of parts may be processed before requests for supply loads that contain a larger number of parts because the delivery station that requests the load with the smaller number of parts is likely to require new parts more quickly than the delivery station that requests the load with the larger number of parts. Various lists that are maintained for servicing requests may be updated as requests for supply loads that should be serviced very quickly are received. The ability to prioritize delivery of supply loads based on quantity of parts within supply loads rather than the time at which requests are received reduces the likelihood that any delivery station will consume all available parts during a production run. Lot and load sequence number information may also be used in locating supplies to service requests so that parts are used in production in accordance with the production schedule.

Figure 2:
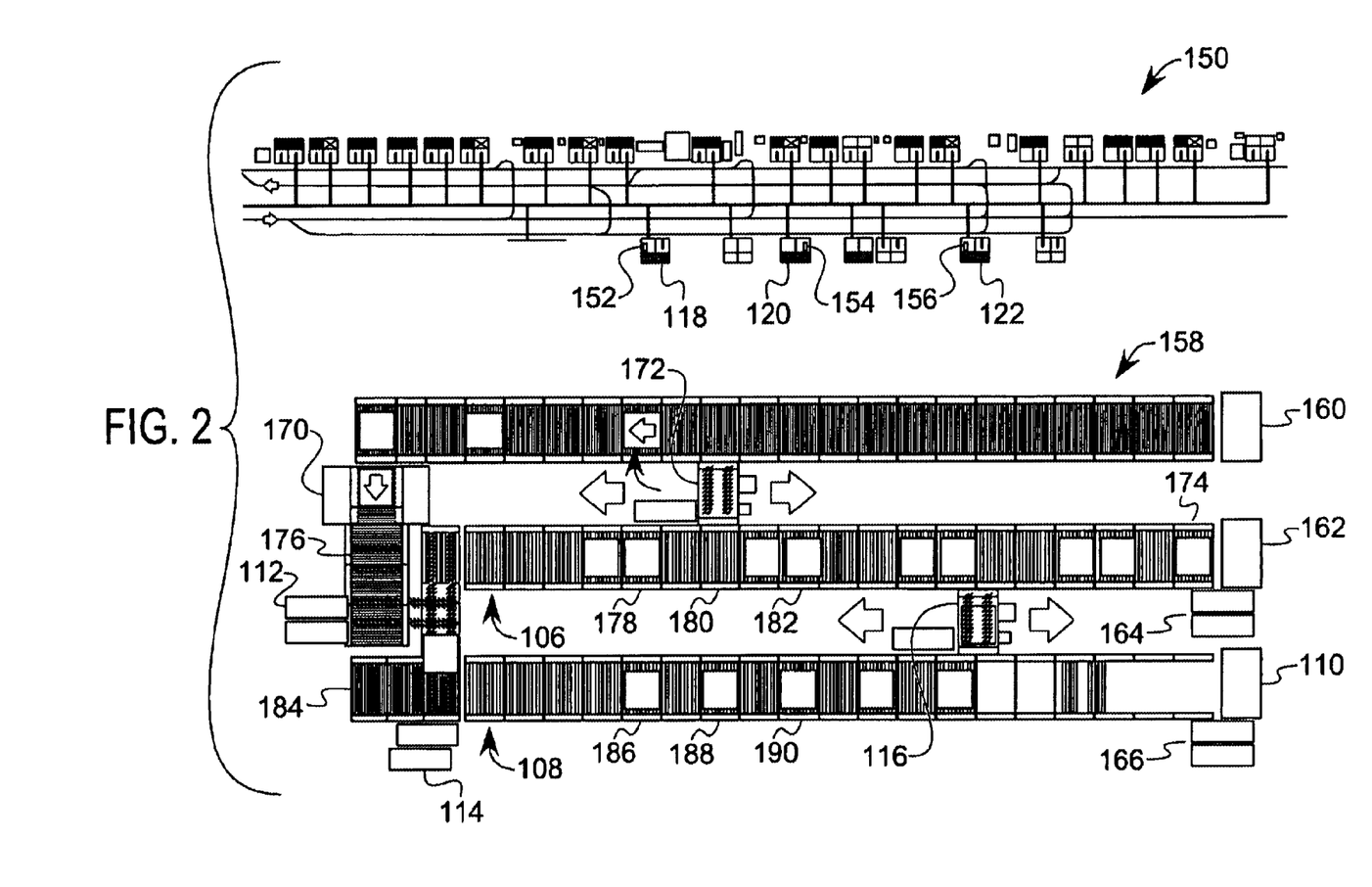
FIG. 2 is a diagram illustrating the delivery of supplies to a production line for an example embodiment of the present invention.

Referring to FIG. 2, a diagram illustrating the delivery of supplies to a production line for an example embodiment of the present invention is shown. A production line 150 may be divided into a plurality of delivery stations (delivery station A 118, delivery station B 120, delivery station C 122). Each delivery station may comprise one or more load positions. Sensors 152, 154, 156 may be installed at the load positions of the delivery stations to detect the absence or presence of a supply load at the load position. As shown in FIG. 2, one sensor is installed at each load position. When a sensor at a delivery station determines that a load position is empty, a request for delivery of supplies may be initiated.

Each delivery station on the production line may be assigned an identifier. For example, the identifiers may be "A" for delivery station 118, "B" for delivery station 120, and "C" for delivery station C 122. Incoming supply loads are labeled with barcodes that comprise a production line delivery station identifier (e.g., for delivery stations A, B, or C).

The conveyor system that receives incoming supplies may comprise one or more outbound and inbound lanes. For example, two outbound lanes 106, 108 may receive incoming supplies to be delivered to the delivery stations 118, 120, 122 on the production line 150. An inbound lane 158 may receive empty pallets that are delivered by the AGVs to an AGV drop station 160. Empty pallets may be returned on the inbound lane 158 to a vertical pallet stacker 170. Pallets may be removed from the vertical pallet stacker 170 and transferred to an outbound conveyor lane station 176 where supply loads are placed on pallets for transfer to an AGV pickup station 162 and delivery from the AGV pickup station 162 to a delivery station on the production 150.

Each outbound conveyor lane 106, 108 may comprise a plurality of conveyor positions (e.g., positions 178, 180, 182 for conveyor lane 106 and positions 186, 188, 190 for conveyor lane 108). Supplies are loaded onto the conveyor lanes 106, 108 at the respective last or back position 176, 184 of each conveyor lane. Barcodes on the supply loads are scanned using a scanner 112, 114 (fixed or handheld) as the supplies are loaded onto the conveyor lanes 106, 108 at last or back conveyor positions 176, 184. Conveyor position information for each supply load is entered and tracked at the supply delivery computer. Initially, each supply load enters a conveyor lane 106, 108 at the last or back position 176, 184 and moves to the adjacent conveyor position using a conveyor forward movement as other supply loads are added to the conveyor lanes 106, 108. As supply loads move along the conveyor lanes 106, 108, the conveyor position information is updated to indicate each supply load's current position.

The production line delivery stations 118, 120, 122 initiate supply requests when the respective sensors 152, 154, 156 in the delivery station load positions determine that supplies are needed. The supply delivery computer (not shown) receives the supply requests from the production line delivery stations. For each request, the supply delivery computer locates on the conveyor lanes 106, 108 a supply load that matches the request. Using the delivery station information and supply load barcode information, the supply delivery computer determines which random access conveyor position on the conveyor lanes 106, 108 holds the needed supplies. The supply load that matches the request is transferred from a random access conveyor position (e.g., using conveyor forward movement or a transfer car 172, 116) to the first or front position of the conveyor lane 106, 108. If the supply load that matches the request is not at the first or front position of the conveyor lane 106, 108, a transfer car 172, 116 may be used to transfer the supply load from one of the random access conveyor positions to a first or front position on the conveyor. The transfer cars 172, 116 may be equipped with scanners to verify identity of supply loads in the random access conveyor positions on the conveyor lanes 106, 108. Small parts (e.g., loaded in bins) on large pallets may be transferred (using conveyor forward movement or a transfer car 172) to a centering device station 174 where the parts are centered on the pallet before transfer to an AGV pickup station 162. Scanners 164,166 at the AGV pickup stations 162,110 scan the supply load barcode labels. Following confirmation that the correct supply load has been transferred to the AGV pickup station 162, 110, an automated guided vehicle is dispatched by the supply delivery computer via the vehicle facility manager computer system to transport the supply load from the pickup station 162,110 to a production line delivery station. From the production line delivery station, the AGV picks up an empty pallet and delivers it to the AGV drop station 160 on the inbound conveyor lane 158 so that it may be used again for additional deliveries.

Figure 3:
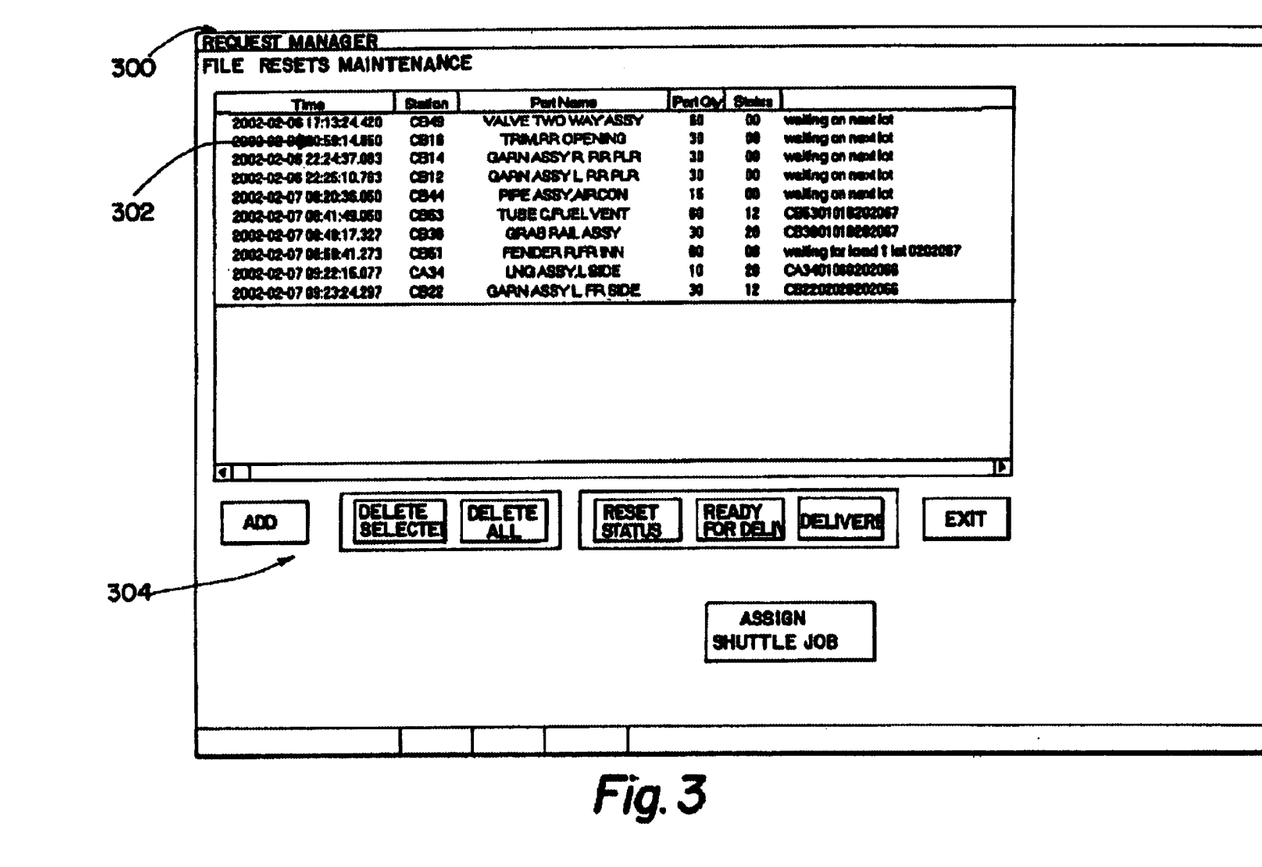
FIG. 3 is a request manager screen for a supply delivery computer system in accordance with an example embodiment of the present invention.

Referring to FIG. 3, a request manager screen for a supply delivery computer system in accordance with an example embodiment of the present invention is shown. The request manager screen 300 displays information regarding all open requests for delivery of supplies. The column displays 302 are as follows:

Time—The time the request was created

Station—The delivery station location

Part Name—The part name of the parts delivered to this delivery station location Part Quantity—The part quantity for one supply load Status—The current status of that request:

00—Initial request

12—The request has been matched to a load on the conveyor

13—The transfer car has rejected a request to retrieve this load

20—The transfer car has been asked to retrieve this load

30—The load is in the AGV pickup position

31—The AGV system never acknowledged the request to deliver the load

90—Delivery in progress or delivered

The last column provides comments regarding the status of the request. This comment may be a supply load identifier if a supply load has been matched, or it may explain why there is no progress on the request. Colors may be used to identify communication errors (e.g., red) and delivery locations not used for certain production types (e.g., blue).

The function keys at the bottom of the screen 304 are as follows:

Add—Add a request. A user may click on this key and select a delivery request to add the request.

Delete Selected—A user may select a request, then click on this key to delete the request.

Delete All—A user may click on this key to delete all requests.

Reset Status 20 to 12—If a transfer car fails to pick up a load, a user may click on the request and use this key to reset the request from a status 20 to a status 12. This action causes the transfer car job to be requested again.

Assign Shuttle Job—A user may select a status 12 load and click on this key. This action forces the selected load to be the next one loaded on the shuttle for that lane.

Ready For Delivery—A user may click on this key to reset the status of a supply load to 30. This action also may be used to reset a status 31 request back to a status 30. This action causes the AGV job to be resubmitted.

Delivered—A user may click on this key to set any request status 12 or greater to delivered.

Figure 4:
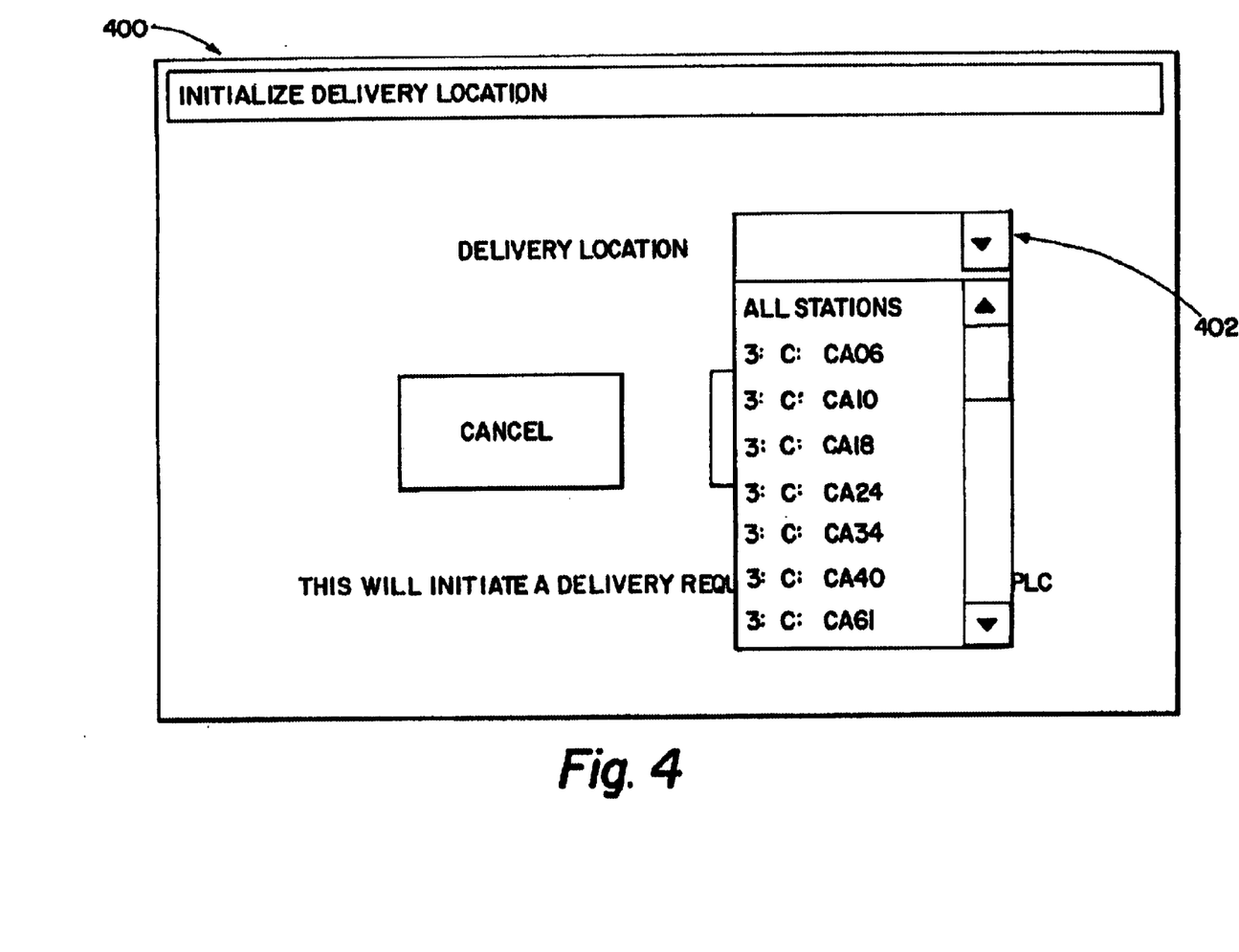
FIG. 4 is an initialize delivery location screen for a supply delivery computer system in accordance with an example embodiment of the present invention.

Referring to FIG. 4, an initialize delivery location screen for a supply delivery computer system in accordance with an example embodiment of the present invention is shown. Initialization forces a new request for a supply load if space is available at the delivery location. The initialize delivery location screen 400 allows a user to specify which delivery stations on the production line to initialize so they will be active during a production run. The user may select initialization of all delivery stations, or the user may individually select the delivery stations to be initialized 402. The supply delivery computer system responds to the initialization requests by initiating commands to have supplies delivered to the delivery location selected during the initialization process.

Figure 5:
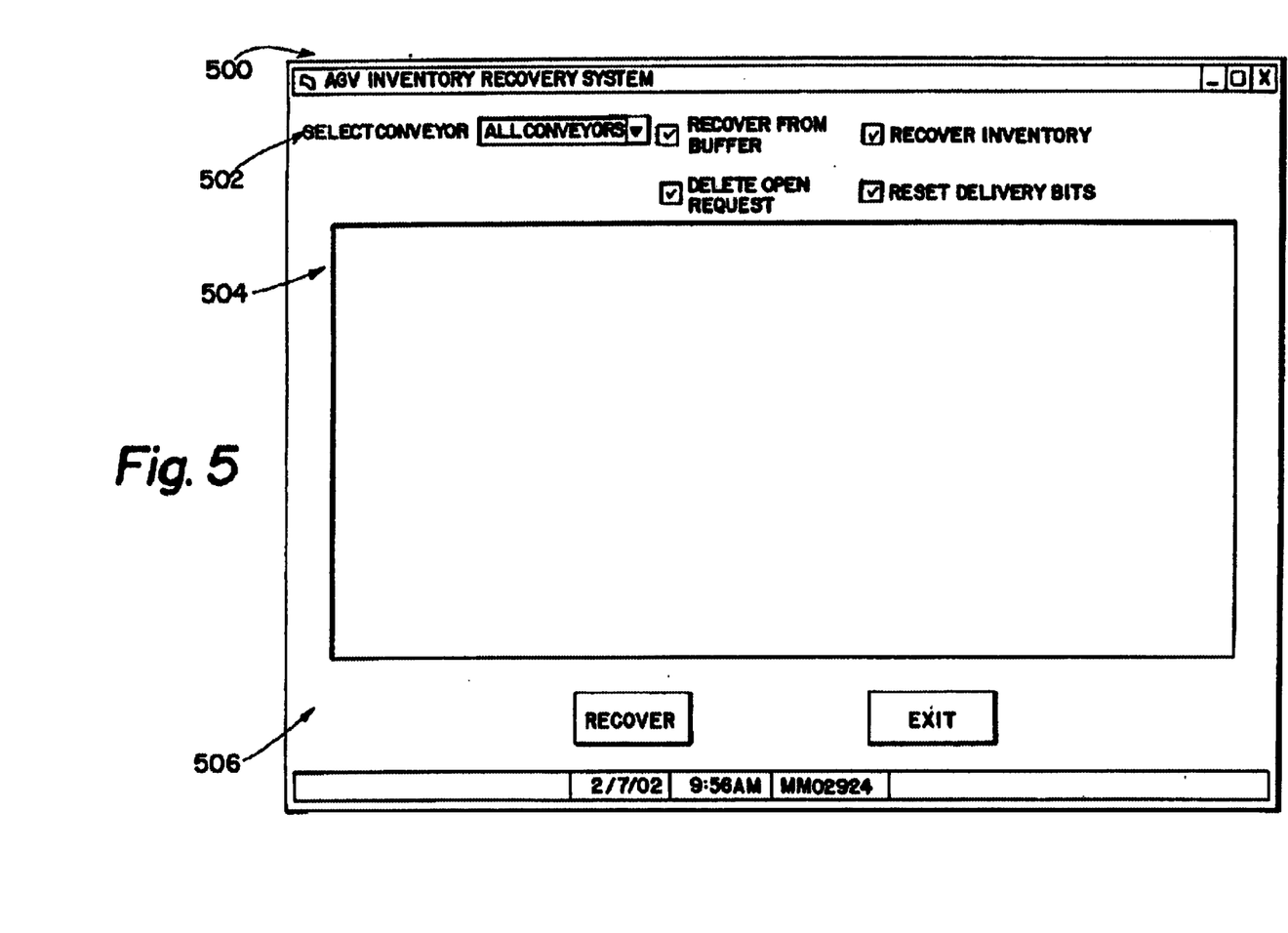
FIG. 5 is an AGV inventory recovery system screen for a supply delivery computer system in accordance with an example embodiment of the present invention.

Referring to FIG. 5, an AGV inventory recovery system screen for a supply delivery computer system in accordance with an example embodiment of the present invention is shown. This screen may be used to recover information from the conveyor system. There are four check boxes 502 to allow certain parts of the recovery to run for selected conveyors. They are as follows:

Recover From Buffer—This option recovers the status of the earlier supply loads (e.g., last 240 loads). Recover Inventory—This option recovers the current conveyor inventory (i.e., what supplies are on the conveyor system).

Delete Open Request—This option deletes all open requests.

Reset Delivery Bits—This option initializes the sensors for all delivery station locations on the production line.

Information regarding the status of the recovery is displayed to the user in the middle of the screen 504. Function keys 506 at the bottom of the screen include "recover" and "edit."

Figure 6:
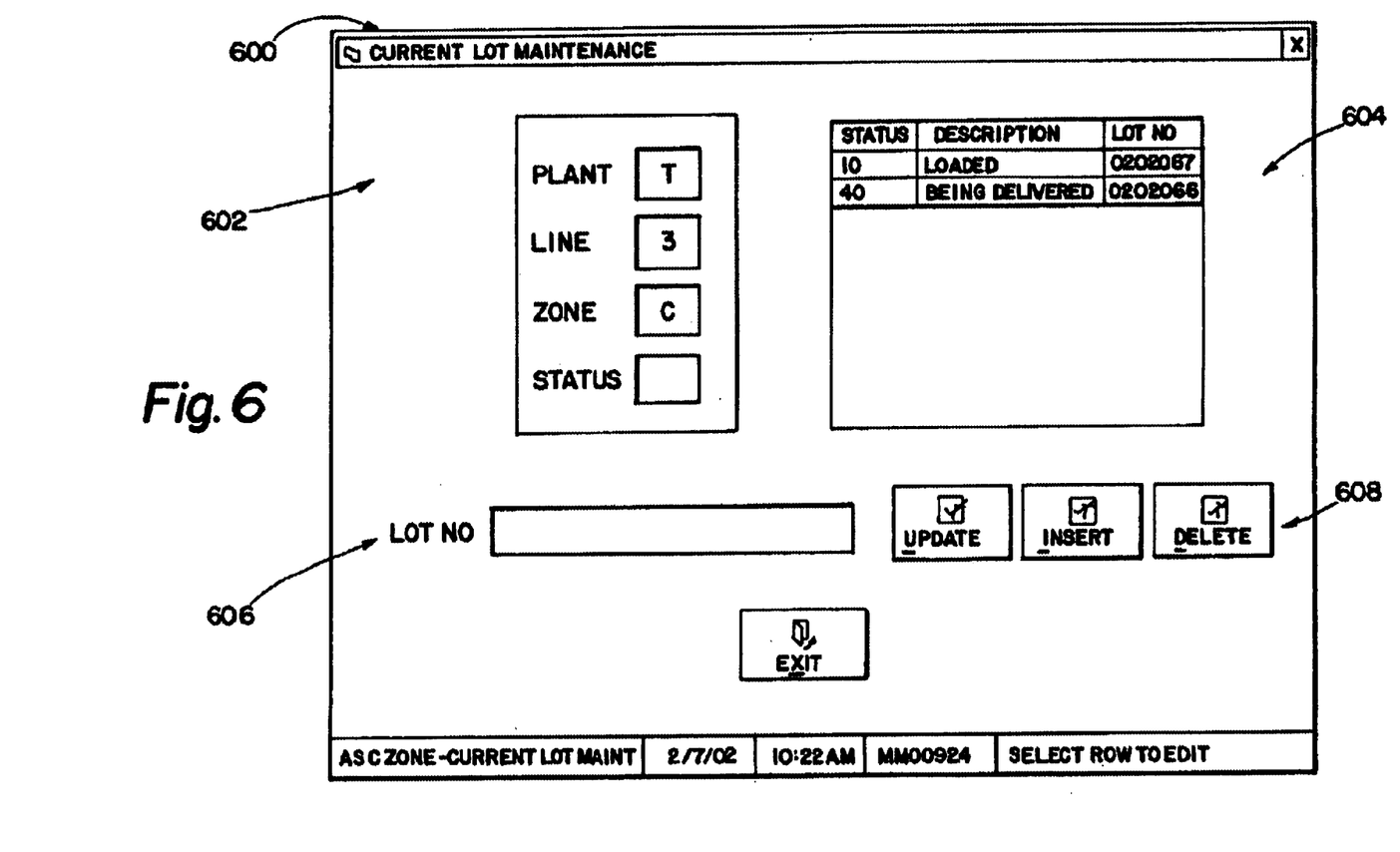
FIG. 6 is a current lot maintenance screen for a supply delivery computer system in accordance with an example embodiment of the present invention.

Referring to FIG. 6, a current lot maintenance screen for a supply delivery computer system in accordance with an example embodiment of the present invention is shown. This screen may be used to view and change the lots that are currently in progress on the production line. It may be accessed through the maintenance menu current lot option on the request manager screen. Information regarding the production facility and line is displayed 602. The lots listed 604 are the lots currently in progress on the production line for the production facility. In the present example, Lot 0202067 is currently being loaded on the conveyor system. Lot 0202066 is currently being delivered to a delivery station on the production line. The following function keys 608 are available:

Update—A user may click on a status line 604 and the lot will appear in the Lot No box 606. The user may change the lot number and then click update 608. The lot for that status will change to the one entered.

Insert—A user may enter a lot number 606, click on a status line 604, then click insert 608. The lot is inserted before the selected lot.

Delete—The user may click on a status line and then click delete. The selected lot is deleted.

Examples illustrate how the current lot maintenance feature may operate. In a first example, a lot has just been loaded. The first supply load from the next lot is put on the conveyor system, but rejected because it is the wrong lot. The screen of FIG. 5 indicates that the lot has been rescheduled for later. The user may select status 10 (loaded), enter the correct lot number, then click update. This action replaces the rescheduled lot.

In a second example, a lot has just been loaded. The first load from the next lot is put on the conveyor system, but rejected because it is the wrong lot. This time, the screen of FIG. 6 indicates that the lot that was just completed. The user may select status 10 (loaded), enter the next lot number, and then click insert. This action updates the status from 10 to 11.

Figure 7:
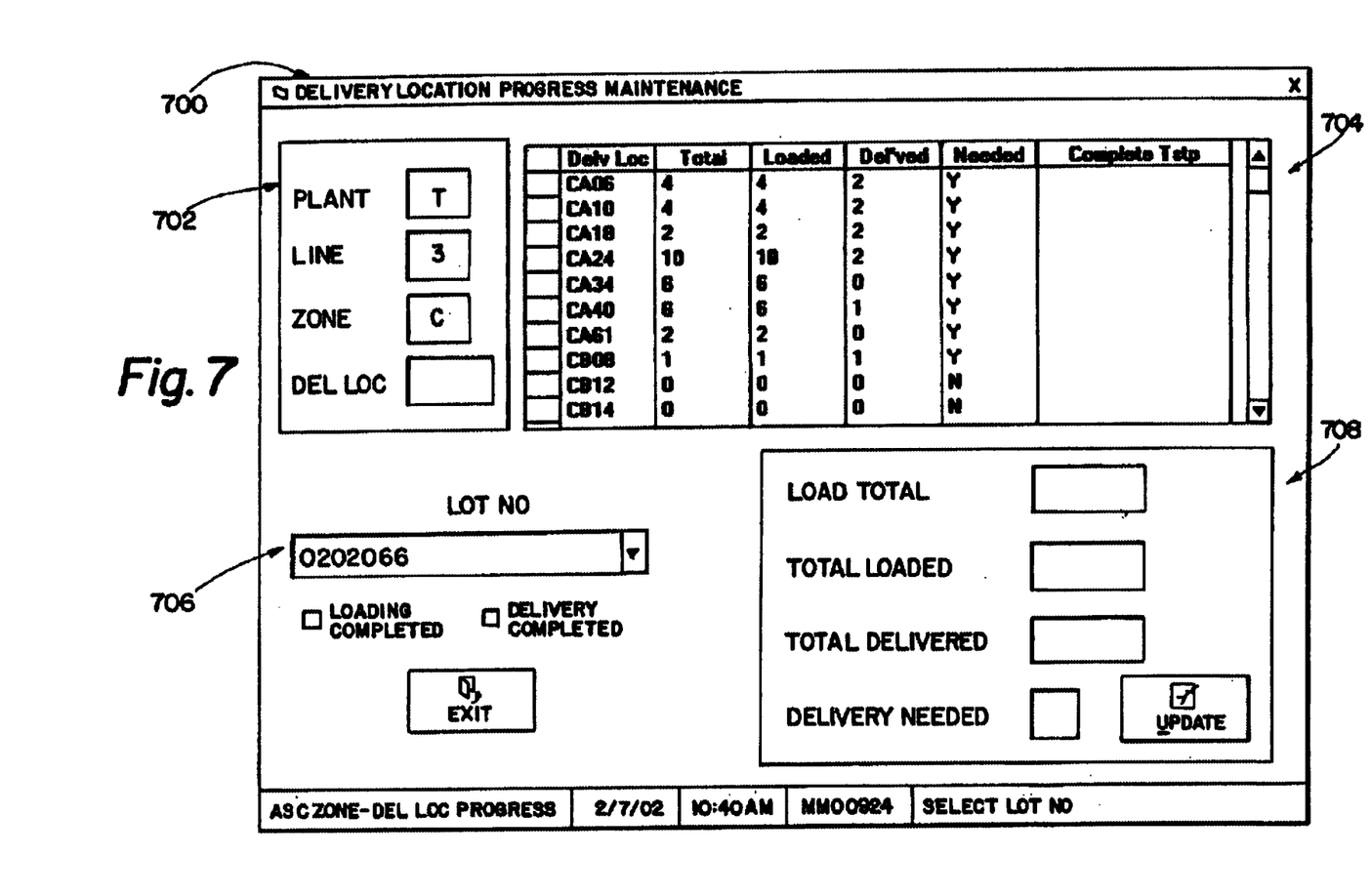
FIG. 7 is a delivery location progress maintenance screen for a supply delivery computer system for an example embodiment of the present invention.

Referring to FIG. 7, a delivery location progress maintenance screen for a supply delivery computer system for an example embodiment of the present invention is shown. This screen may be used to view or change the delivery progress information. It may be accessed through the maintenance menu delivery progress option of the request manager screen. Information regarding the production facility and line is displayed 702. The following information regarding the delivery progress 704 is shown:

Delv Loc—Delivery station location

Total—Total number of deliveries for this delivery station location

Loaded—The number of deliveries that has been loaded on the conveyor

Del'ved—The last delivered load

Needed—Indicates whether a delivery is needed for the delivery station location

Delivery information may be changed if an abnormal situation arises (e.g., forklift delivery required, packaging changes occurred). An example illustrates operation of the update function. For CA06 604, the total delivery sends is four, four deliveries were loaded onto the conveyor, two deliveries were completed, and the third send was delivered to the production line delivery station by forklift for lot 066. The user may first select Lot Number 0202066 (706). All the delivery locations are displayed along with delivery information. The Load Total number 708 may be confirmed or changed to match the situation. This option may be used when there has been a packaging change. The Total Loaded number 708 may be confirmed or changed to match the situation. This option may be used when there is no change necessary. The Total Delivered number 708 may be confirmed or changed to match the situation. To indicate that a forklift delivery occurred, the number may be changed from 2 to 3. The user may then click Update 708. The Delivery Needed number 708 may be confirmed or changed to match the situation. This option may be used when there has been a packaging change.

Figure 8:
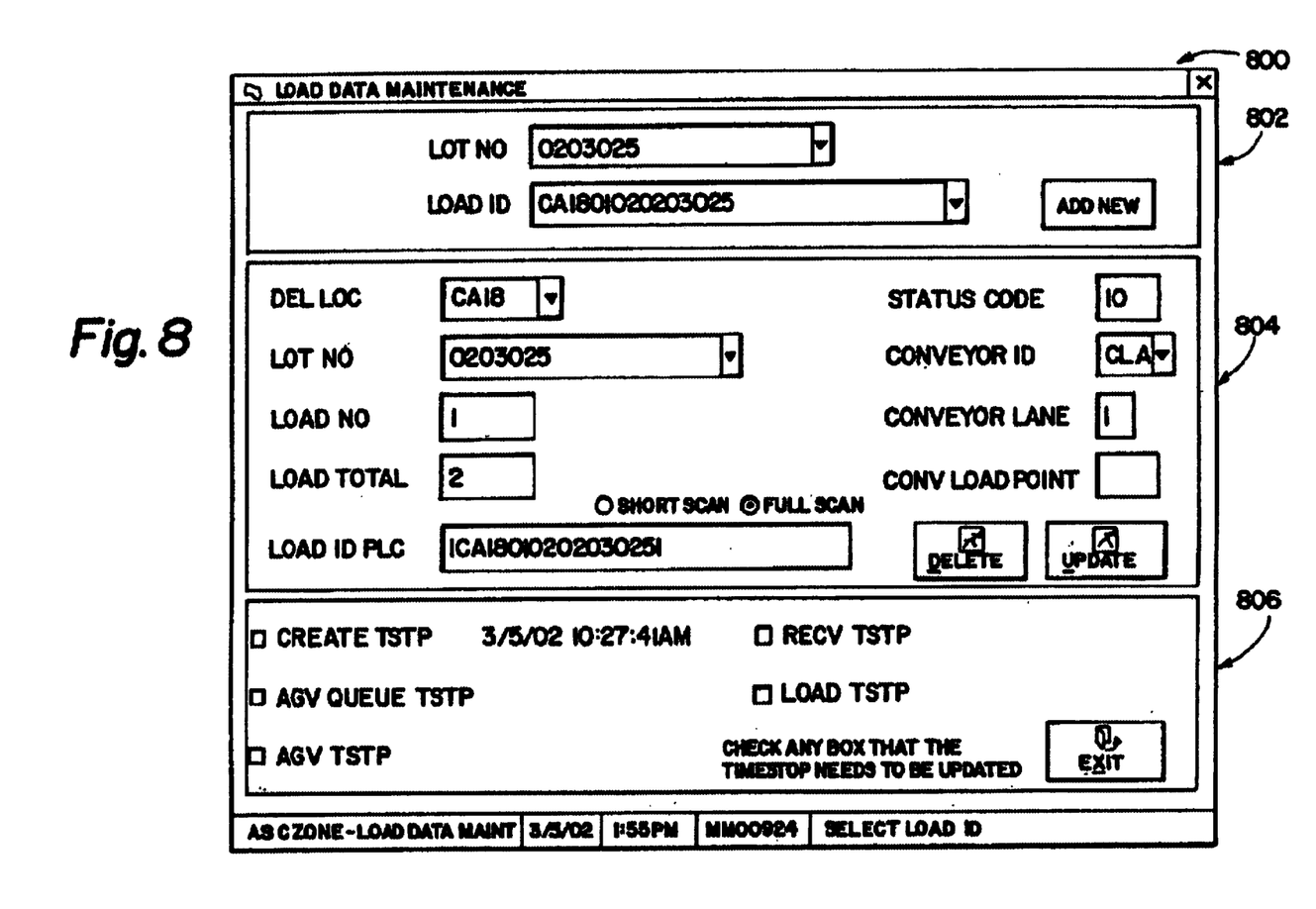
FIG. 8 is a load data maintenance screen for a supply delivery computer system for an example embodiment of the present invention.

Referring to FIG. 8, a load data maintenance screen for a supply delivery computer system for an example embodiment of the present invention is shown. This screen may be used to view or change the supply load data information. It may be accessed through the maintenance menu load data option of the request manager screen. Data may be changed due to an abnormal situation (e.g., a load enters the conveyor system and the load is not recognized or there is a change in the status code). The lot number and load identifier is shown at the top of the screen 802. The current data for that load identifier is displayed in the middle of the screen. The user may first enter or select the following information 804:

Delivery Loc—Delivery station location where the load will be delivered

Lot No—Lot number for the load

Load No—Sequence of this load for the lot number and delivery station location (In this example, the load is the first delivery for delivery station CA18 in lot number 0203025.)

Load Total—Total deliveries for the lot number and delivery station location. (In this example, there are two deliveries to CA18 in lot 0203025.)

Load ID PLC—Identifier indicating how the load is identified on the conveyor system. The user may click short scan or full scan to toggle between a full barcode scan and a manual scan out of a book.

Status Code—Status of the load. The user may click on change status or click on update.

Conveyor ID—Identifier the indicating the conveyor from which the load is delivered.

Conveyor Lane—Conveyor lane for the load.

Conveyor Load Position—Load point (position) where the supply load was put on the conveyor.

At the bottom of the screen 806, the user may select among options for updating timestamps associated with the selected lot number and load number.

Figure 9:
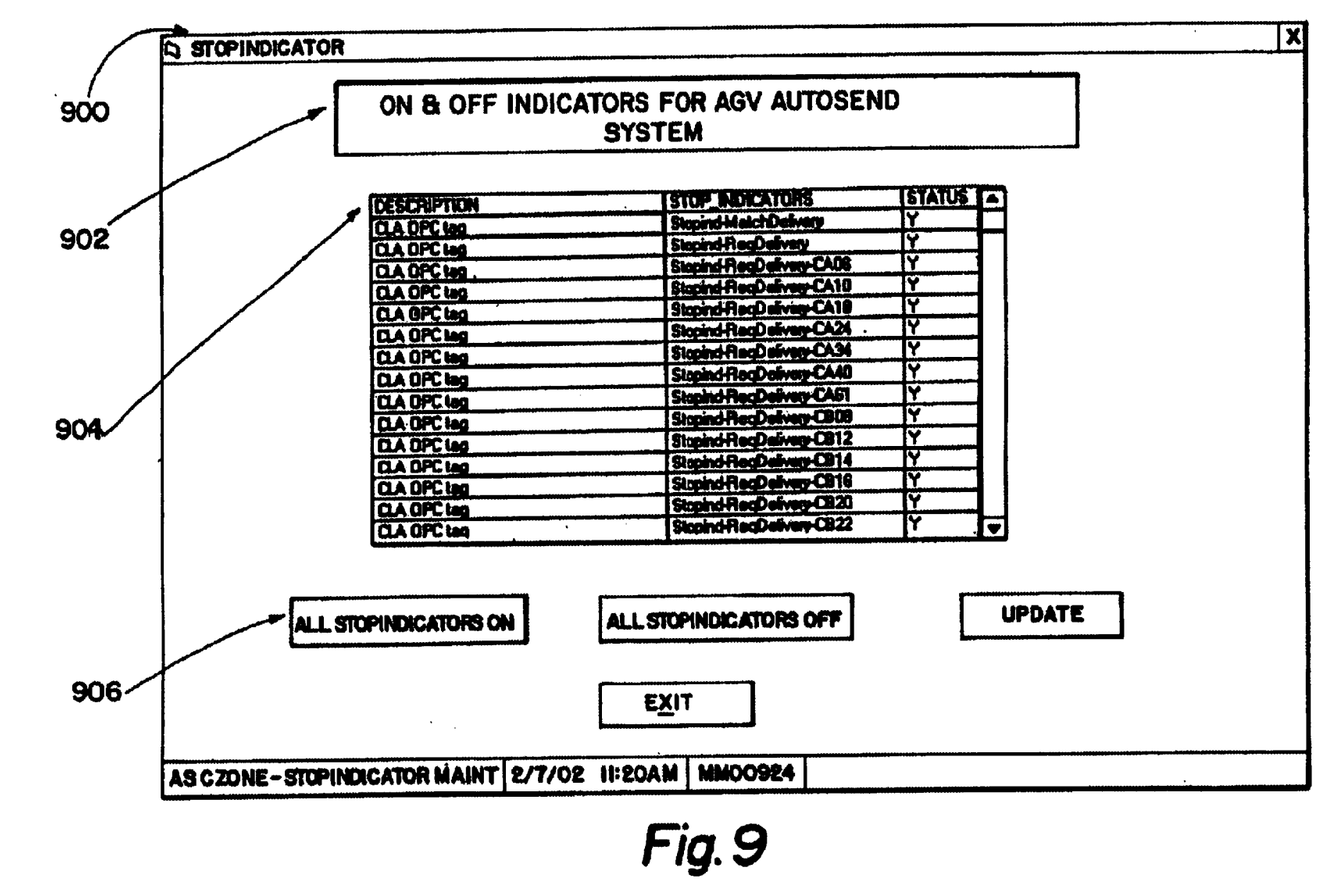
FIG. 9 is a stop indicator screen for a supply delivery computer system for an example embodiment of the present invention.

Referring to FIG. 9, a stop indicator screen for a supply delivery computer system for an example embodiment of the present invention is shown. This screen 900 may be used to view or change the supply load data information. It may be accessed through the maintenance menu stop indicators option of the request manager screen. The stop indicator functions 906 are used to stop and start certain functions with the supply delivery computer system. Information regarding the supply delivery computer system is displayed at the top of the screen 902. A description, stop indicator value, and status is displayed 904 in the middle of the screen. A user may select an indicator, change its status, and then click the update function 906. 'Y' indicates that the function is running and 'N' indicates it is off. Stop indicators include the following:

| | |
|---|---|
| CLA OPC tag | Stopind-MatchDelivery: Request from delivery location trying to match on conveyor |
| | StopindReqDelivery: All delivery locations request function |
| | StopindReqDelivery CA06: Request delivery function for Headliners |
| | StopindReqDelivery CA10: Request delivery function for RR Tray |
| | StopindReqDelivery CA18: Request delivery function for Carpet |
| | StopindReqDelivery CA24: Request delivery function for HVac |
| | StopindReqDelivery CA34: Request delivery function for L, Sideliners |
| | StopindReqDelivery CA40: Request delivery function for R, Sideliners |
| | StopindReqDelivery CA61: Request delivery function for Silencers |
| | StopindReqDelivery CB08: Request delivery function for C to A |

-continued

```
StopindReqDelivery CB12: Request delivery function for C to A (4-dr.)
StopindReqDelivery CB14: Request delivery function for C to A (4-dr.)
StopindReqDelivery CB16: Request delivery function for C to A
StopindReqDelivery CB20: Request delivery function for C to A
StopindReqDelivery CB22: Request delivery function for C to A
StopindReqDelivery CB26: Request delivery function for C to A
StopindReqDelivery CB28: Request delivery function for C to A
StopindReqDelivery CB30: Request delivery function for C to A
StopindReqDelivery CB32: Request delivery function for L Tail lights
StopindReqDelivery CB36: Request delivery function for R Tail lights
StopindReqDelivery CB38: Request delivery function for C to A
StopindReqDelivery CB44: Request delivery function for C to A
StopindReqDelivery CB49: Request delivery function for C to A
StopindReqDelivery CB51: Request delivery function for R, Fender Inn
StopindReqDelivery CB53: Request delivery function for C to A
StopindReqDelivery CB55: Request delivery function for Canister Assy
StopindReqDelivery CB57: Request delivery function for RR Stabi Assy
StopindReqDelivery CB59: Request delivery function for C to A
StopindReqDelivery CE04: Request delivery function for Pipe B Exhaust
StopindReqDelivery Heartbeat: ISG Communication to CEC
StopindReqDelivery Lane CLA1: Do Not Use (Communication)
StopindReqDeliveryLane CLA2: Do Not Use (Communication)
StopindReqDelivery CLA: Do Not Use (Communication)
StopindReqDelivery Transfer CLA1: Request function to T-Car Lane 1
StopindReqDelivery Transfer CLA2: Request function to T-Car Lane 2
StopindReqDelivery OPCAGVinterface: Communication with mini-host
StopindReqDelivery VFMAGVinterface: Communication function to the AGVs (Job Request)
```

The present invention reduces the misdelivery of supplies in a production environment by ensuring that the appropriate supplies are delivered to the correct location on the production line. As a result, production line efficiency is increased and may result in reduced production costs.

INDUSTRIAL APPLICABILITY

The present invention supports automated delivery of supplies from a production facility loading dock to a production line using a supply delivery computer system that interfaces with a conveyor computer system to control transportation of supplies from a conveyor system to pickup stations and a vehicle facility manager computer system to control automated guided vehicles that transport supplies from pickup stations on the conveyor system to delivery stations on a production line. Supplies are labeled with barcodes that facilitate tracking and routing. The present invention eliminates the need for manual handling of supplies from the time they are received on the conveyor system until they are delivered to the production line.

While example embodiments of the invention have been illustrated and described, various modifications and combinations can be made without departing from the spirit and scope of the invention. For example, the features and functionality of the present invention may be provided using fewer computers or more computers than described in accordance with an example embodiment of the present invention. Modifications, combinations, and equivalents to the system and method of the present invention are intended to be covered and claimed.

What is claimed is:

1. A method for delivering supplies to a production line comprising:

labeling a plurality of supply loads with barcodes comprising a production line delivery station identifier;

loading said supply loads on a conveyor, said conveyor comprising a plurality of positions;

scanning said barcodes on each of said supply loads loaded on said conveyor;

transferring each of said supply loads on said conveyor into one of said plurality of positions on said conveyor;

entering into a computer said barcodes and said position for each of said supply loads;

receiving at said computer a request for one of said plurality of supply loads on said conveyor, said request received from a production line delivery station;

locating a supply load on said conveyor to match said request, said supply load located by said computer in accordance with said production line delivery station identifier and said barcode and said position for each of said supply loads;

transferring said located supply load from said conveyor position to a pickup station;

dispatching an automated guided vehicle to transport said located supply load from said pickup station to said production line delivery station; and transporting by said automated guided vehicle said located supply load from said pickup station to said production line delivery station.

2. The method of claim 1 wherein transferring each of said supply loads into one of said plurality of positions on said conveyor comprises transferring each of said supply loads to a random access position on said conveyor.

3. The method of claim 2 wherein locating a supply load on said conveyor to service said request comprises locating said supply load in accordance with said random access position on said conveyor.

4. The method of claim 3 further comprising:

transferring a supply load on said conveyor to said random access position on said conveyor after said located supply load is transferred to said pickup station.

5. The method of claim 1 wherein receiving a request for one of said plurality of supply loads on said conveyor, said request received from a production line delivery station comprises receiving said request from a sensor on said production line delivery station.

6. The method of claim 1 wherein locating a supply load on said conveyor to match said request comprises transmitting said request from said computer to a conveyor system computer.

7. The method of claim 1 wherein dispatching an automated guided vehicle comprises transmitting a dispatch request from said computer to a vehicle facility manager computer.

8. The method of claim 1 wherein transferring said located supply load from said conveyor position to a pickup station comprises transferring said located supply load from said conveyor position to a pickup station in accordance with a transfer car.

9. The method of claim 1 wherein transferring said located supply load from said conveyor position to a pickup station comprises transferring said located supply load from said conveyor position to a pickup station in accordance with a conveyor forward movement.

10. The method of claim 1 further comprising:
labeling said plurality of supply loads with barcodes comprising a quantity for each of said supply loads;
receiving at said computer a second request for one of said plurality of supply loads on said conveyor, said request received from a second production line delivery station;
receiving at said computer a third request for one of said plurality of supply loads on said conveyor, said request received from a third production line delivery station;
locating a second supply load on said conveyor to match said second request, said supply load located by said computer in accordance with said production line delivery station and said barcode and said position for each of said supply loads;
locating a third supply load on said conveyor to match said third request, said supply load located by said computer in accordance with said production line delivery station identifier and said barcode and said position for each of said supply loads;
determining the quantity of supplies in said second supply load and said third supply load;
transferring to a pickup station said third supply load if said third supply load has fewer supplies than said second supply load or said second supply load if said second supply load has fewer supplies than said third supply load; and
dispatching an automated guided vehicle to transport the supply load from said pickup station.

11. The method of claim 1 further comprising:
transferring an empty pallet from said production line delivery station to said automated guided vehicle; and
delivering said empty pallet to an automated guided vehicle drop station at an inbound lane of said conveyor.

12. A method for delivering supplies to a production line:
labeling a plurality of supply loads with barcodes comprising a production line delivery station identifier and quantity of supplies for each of said supply loads;
loading said supply loads on a conveyor, said conveyor comprising a plurality of positions;
scanning said barcodes on each of said supply loads loaded on said conveyor;
transferring each of said supply loads on said conveyor into one of said plurality of positions on said conveyor;
entering into a computer said barcodes and said position for each of said supply loads;
receiving at said computer requests for said supply loads on said conveyor, said requests received from production line delivery stations;
determining a priority for servicing said requests for said supply loads;
locating supply loads on said conveyor to match said requests, said supply loads located by said computer in accordance with said production line delivery station identifiers, said barcodes and said positions for each of said supply loads, and said priorities for said requests;
transferring said located supply loads from said conveyor positions to pickup stations;
dispatching automated guided vehicles to transport said located supply loads from said pickup stations to said production line delivery stations; and
transporting by said automated guided vehicles said located supply loads from said pickup stations to said production line delivery stations.

13. The method of claim 12 wherein transferring each of said supply loads into one of said plurality of positions on said conveyor comprises transferring each of said supply loads to a random access position on said conveyor.

14. The method of claim 13 wherein locating a supply load on said conveyor to service said requests comprises locating said supply loads in accordance with said random access positions on said conveyor.

15. The method of claim 14 further comprising:
transferring remaining supply loads on said conveyor to new random access positions on said conveyor after said located supply loads are transferred to said pickup stations.

16. The method of claim 12 wherein receiving requests for supply loads on said conveyor comprises receiving said requests from sensors on said production line delivery stations.

17. The method of claim 12 wherein locating supply loads on said conveyor to match said requests comprises transmitting said requests from said computer to a conveyor system computer.

18. The method of claim 12 wherein dispatching automated guided vehicles comprises transmitting dispatch requests from said computer to a vehicle facility manager computer.

19. The method of claim 12 wherein determining a priority for servicing said requests for said supply loads comprises determining the quantity of supplies in each supply load and servicing the requests from smallest quantity to largest quantity.

20. The method of claim 12 wherein transferring said located supply load from said conveyor position to a pickup station comprises transferring said located supply load from said conveyor position to a pickup station in accordance with a transfer car.

21. The method of claim 12 wherein transferring said located supply load from said conveyor position to a pickup station comprises transferring said located supply load from said conveyor position to a pickup station in accordance with a conveyor forward movement.

22. The method of claim 12 further comprising:
transferring an empty pallet from said production line delivery station to said automated guided vehicle; and
delivering said empty pallet to an automated guided vehicle drop station at an inbound lane of said conveyor.

23. A system for delivering supplies to a production line comprising:
a conveyor computer system adapted to:
a) receive barcode information about supply loads received on a plurality of conveyor lanes, said barcode information comprising a production line delivery station identifier;

b) receive position information for each of said supply loads on said plurality of conveyor lanes;
c) transmit requests to locate supply loads on said plurality of conveyor lanes in accordance with said position information for each of said supply loads; and
d) transmit requests to transfer supply loads from said positions on said plurality of conveyor lanes to pickup stations;
a vehicle facility manager computer adapted to receive and track requests to dispatch automated guided vehicles adapted to receive supply loads from pickup stations at said conveyor lanes and deliver them to production line delivery stations; and
a supply delivery computer adapted to:
a) receive from said conveyor computer system said barcode information for said supply loads;
b) receive from production line delivery stations requests for delivery of supplies;
c) process said production line delivery station requests;
d) transmit to said conveyor system computer commands to locate and transport to said pickup stations supply loads to service said requests for said delivery of supplies; and
e) transmit to said vehicle facility manager computer commands to dispatch automated guided vehicles to transport supply loads from said pickup stations to said production line delivery stations.

24. The system of claim 23 wherein said supply loads are received in said conveyor lanes in a random order.

25. The system of claim 23 wherein said requests for supply loads are received from sensors on said production line delivery stations.

26. The system of claim 23 wherein said supply delivery computer processes said request for supplies in accordance with the quantity of supplies in each of said supply loads.

27. The system of claim 23 further comprising transfer cars to transfer supply loads from said positions on said plurality of conveyor lanes to pickup stations.

28. A system for delivering supplies to a production line comprising:
a production line comprising a plurality of delivery stations, each of said delivery stations comprising at least one sensor for detecting the presence of a supply load;
at least one outbound conveyor lane for transferring supply loads from a back position on said outbound conveyor lane to a front position on said outbound conveyor lane;
a first scanner at said back position of said outbound conveyor lane for reading barcode labels on supply loads loaded on said outbound conveyor lane;
an automated guided vehicle pickup station at said front position for receiving supply loads from said outbound conveyor lane wherein said supply loads are transferred to said automated guided vehicle pickup station in accordance with supply delivery requests initiated by said sensors at said delivery stations;
a second scanner at said automated guided vehicle pickup station for confirming said supply load at said automated guided vehicle pickup station matches one of said supply delivery requests; and
an automated guided vehicle for transferring supply loads from said automated guided vehicle pickup station to said delivery stations on said production line.

29. The system of claim 28 further comprising:
at least one inbound conveyor lane; and
an automated guided vehicle drop station at said inbound conveyor lane for receiving empty pallets wherein said empty pallets are delivered by said automated guided vehicle upon return from one of said delivery stations on said production line.

30. The system of claim 29 further comprising a vertical pallet stacker at said inbound conveyor lane for stacking said empty pallets.

31. The system of claim 28 wherein said supply loads are transferred to said automated guided vehicle pickup station in accordance with conveyor forward movements.

32. The system of claim 28 further comprising a transfer car for transferring supply loads from random positions of said outbound conveyor lane to said front position of said outbound conveyor lane.

33. The system of claim 32 wherein said transfer car comprises a scanner for locating supply loads in said random positions of said outbound conveyor lane.

34. The system of claim 28 wherein said front position of said outbound conveyor lane is a centering device station where the supply load is centered on a pallet for delivery to the production line.

* * * * *